United States Patent
Gilgen

(10) Patent No.: US 6,299,695 B1
(45) Date of Patent: Oct. 9, 2001

(54) METHOD AND APPARATUS FOR PROCESSING CERAMIC COMPONENTS

(75) Inventor: Ralf Gilgen, Velbert (DE)

(73) Assignee: Steag Aktiengesellschaft (DE)

( * ) Notice: Subject to any disclaimer, the term of this patent is extended or adjusted under 35 U.S.C. 154(b) by 0 days.

(21) Appl. No.: 09/485,054
(22) PCT Filed: Jul. 18, 1998
(86) PCT No.: PCT/EP98/04472
§ 371 Date: Jan. 31, 2000
§ 102(e) Date: Jan. 31, 2000
(87) PCT Pub. No.: WO99/06147
PCT Pub. Date: Feb. 11, 1999

(51) Int. Cl.$^7$ .................................................. B08B 3/12
(52) U.S. Cl. ........................ 134/1; 209/30; 209/250; 209/321; 209/590
(58) Field of Search ............................. 134/1; 209/590, 209/320, 321, 30, 247, 250

(56) References Cited

U.S. PATENT DOCUMENTS

| | | | |
|---|---|---|---|
| 1,587,623 | * 6/1926 | Zuckerman | 209/290 |
| 3,948,764 | * 4/1976 | Edwards | 209/30 |
| 4,405,454 | * 9/1983 | Hultsch | 209/290 |
| 4,457,840 | * 7/1984 | Nagi | 209/320 |
| 4,914,256 | * 4/1990 | Rodewald | 134/1 |
| 4,992,614 | * 2/1991 | Rodewald | 134/1 |

FOREIGN PATENT DOCUMENTS

| | | |
|---|---|---|
| 1122632 | * 8/1968 | (GB). |
| 119343 | * 5/1989 | (JP). |
| 057762 | * 3/1998 | (JP). |
| 057766 | * 3/1998 | (JP). |

* cited by examiner

Primary Examiner—Randy Gulakowski
Assistant Examiner—Saeed Chaudhry
(74) Attorney, Agent, or Firm—R. W. Becker & Associates; R. W. Becker

(57) ABSTRACT

A method and apparatus for processing or cleaning ceramic components that are contaminated with dust deposits are provided. Relative vibrations are generated between the ceramic components and the ambient atmosphere for dislodging dust deposits from the ceramic components. Dislodged dust deposits are collected and conveyed away for disposal or further use. To accomplish this, a screen base is disposed within a closable chamber. A first conveyor is disposed within the chamber below the screen base and leads to a transfer station. A mechanism for generating relative vibrations is disposed between the screen base and the atmosphere of the chamber. An enclosed second conveyor leads from the transfer station to a replaceable receiving vessel. An infra sound producer is disposed within the chamber.

19 Claims, 1 Drawing Sheet

METHOD AND APPARATUS FOR PROCESSING CERAMIC COMPONENTS

BACKGROUND OF THE INVENTION

The present invention relates to a method for processing ceramic components that have become contaminated by dust deposits, especially contaminated ceramic catalytic converters or catalyzers that remove nitrogen.

The present invention further relates to an apparatus for cleaning ceramic components that have been contaminated with dust deposits, especially contaminated ceramic catalyzers that remove nitrogen.

The invention will be subsequently explained in conjunction with ceramic catalyzers such as are used in nitrogen oxide reduction apparatus. However, the invention can be utilized anywhere where ceramic components are to be cleaned and processed after they have been contaminated by dust deposits.

The flue gases from power plants, refuse incinerators and the like must be cleaned before they can be released into the atmosphere.

A nitrogen removal stage is integrated into the cleaning process, during which the $NO_x$ is reduced by the addition of ammonia, and in particular in the presence of catalyzers. These catalyzers reduce the reaction temperature and accelerate the reduction process. They comprise ceramic material, the main substituent of which is titanium dioxide. The catalytically active material is vanadium pentoxide or tungsten trioxide.

The catalyzers comprise so-called catalyzer elements that are embodied as elongated honeycombed bodies and form separate, parallel flow channels having rectangular and generally square cross-sectional areas. The catalyzer elements are combined into modules, with each module having a steel frame into which the catalyzer elements are inserted parallel to one another.

By way of example, the power plant Bergkamen A (electrical capacity 750 MW) is provided with two nitrogen removing reactors that are provided with a total of 41,472 catalyzer elements, each of which has an external dimension of 150×150×840 mm. The total weight of the catalyzer modules is 800 t.

The useful life of the catalyzers is not unlimited. Rather, a deactivation occurs, whereby dust particles that contain noxious or harmful material are deposited upon the catalyzer walls. The rapidity with which this occurs depends upon at which location of the flue gas cleaning process the nitrogen removal is undertaken. Keeping this in mind, the most favorable location would be in an arrangement downstream of the flue gas desulfurization apparatus, but the flue gas temperature at this location is not sufficient for heating up the catalyzers to the reaction temperature. In this connection, a reheating of the flue gases would be necessary. To this extent, more favorable conditions are found in the vicinity of the boiler upstream of the air preheater. This involves the so-called high-dust control, with which, however, the degree of contamination of the catalyzer elements is the greatest.

By means of periodic intermediate cleaning, the useful life of the catalyzers can be extended. For this purpose, up to now so-called soot blowers in the form of traverse blowers have been used, which are integrated into the nitrogen oxide reduction apparatus. They comprise nozzle connections that are guided over the catalyzers and blow hot steam into the catalyzer elements. The traverse blowers represent a considerable capital expenditure for apparatus. Furthermore, the effectiveness of the cleaning also leaves something to be desired, since the blast energy is already dissipated after a few centimeters.

Finally, the catalyzer elements are spent and must be replaced.

The processing of the spent ceramic catalyzers represents a considerable problem. The catalyzers are ground, whereupon in principle the possibility exists for cleaning the ceramic material and reusing it as base material for the manufacture of catalyzers. However, the cleaning is extraordinarily expensive because with this type of reuse, the chemical properties of the material play the important role. In addition, the material is not refired, but rather is merely calcined at about 900° C. and therefore receives a strength that is less than that of fired ceramic. Therefore, the up to now most frequently encountered alternative is to dispose of the spent and ground catalyzers in the contaminated state in dumps, or to supply it as an additive or filler to a slag tap furnace of a coal-fired power plant.

SUMMARY OF THE INVENTION

It is an object of the present invention to improve the intermediate cleaning of the ceramic catalyzers as well as to enable an economical and ecological processing of the spent catalyzers.

To realize this object, the method referenced in the introductory portion is inventively characterized in that relative vibrations are generated between the catalyzers and the surrounding atmosphere that dislodge the dust deposits from the catalyzers, and in that the dislodged dust deposits are collected and conveyed away for disposal or further use.

In this way, the ceramic catalyzers can be cleaned in a simple and economical manner.

This can be effected as an intermediate cleaning within the nitrogen oxide reduction apparatus, whereby the capital expenditure for equipment is low. The intensive cleaning effect enables a significant extension of the overall useful life of the catalyzers. The collection of the dislodged dust deposits is effected in a subsequently disposed electro filter.

The method is likewise suitable for processing spent ceramic catalyzers that can no longer be reactivated by an intermediate cleaning. The catalyzers are cleaned so intensively that the material thereof, after subsequent grinding, can be used anywhere in the ceramic industry where the chemical properties of the material play no role. The range of application that is available is very extensive. The high value ceramic material can thus be economically reused and is not lost without compensation. If one takes into account the quantities that are produced, for example as illustrated previously in conjunction with the power plant Bergkamen A, the considerable cost advantage is obvious.

The dislodged dust deposits that collected can be disposed of in a dump or can be conveyed to a slag tap furnace.

The relative vibrations are preferably generated as gas vibrations in the surrounding atmosphere of the catalyzers. This process is expediently suitable for the intermediate cleaning of built-in catalyzers but can also be utilized for the processing of spent catalyzers. In the last-mentioned situation, a high energy input with a correspondingly high cleaning power is effected in a limited space.

It is furthermore particularly advantageous to generate the gas vibrations in the low frequency sound range, preferably in the infrasonic range. This allows relatively great vibration amplitudes to be generated with relatively little expenditure of energy. The gas columns within the catalyzer elements are thus moved correspondingly vigorously. In addition, the infra sound spreads uniformly in all directions, so that therefore a high debris of structural freedom is allowed. Frequencies of about 25 Hz have shown to be preferable. It has been shown that the desired effect decreases with increasing frequency, whereby, however, frequencies in the range of about 100 Hz are quite practicable. The resonance range of the nitrogen removal apparatus is at 60 Hz to 70 Hz, and should, of course, be avoided.

The gas vibrations are advantageously generated by a vibration producer. In the nitrogen oxide reduction apparatus, they overlap with the flow of the gas that is to cleaned.

As an alternative, it is proposed in a further embodiment of the invention to blow against the catalyzers with at least one pulsating gas stream. This corresponds to the manner of operation of a siren, whereby the gas stream as such is in the position to enhance the cleaning effect.

In principle, it is possible to differentiate between the cleaning of the complete catalyzer elements and the periodic intermediate cleaning within the nitrogen removal apparatus. In the first-mentioned situation, there results a very intensive cleaning effect. In the last-mentioned situation, the particles that are not yet securely deposited on the catalyzer surfaces are loosened and are carried out with the gas stream. Thus, involved is more a process of keeping clean than an intensive cleaning, as comes into play in the case of spent catalyzers.

It was discovered that the low frequency sound impingement of catalyzers that are being used has a very particularly advantageous side effect, namely an increase of the catalytic effectiveness. This effect is attributable to the fact that the laminar boundary layer on the catalyzer surfaces is pulled away and is converted into a turbulent flow. This takes place under the effect of the vibrations of the shifting gas columns. In addition, the particles that are conveyed by the gas are hurled into the boundary layer, where they contribute to the turbulence that is imparted to them. On the whole, there results an acceleration of the material exchange processes. Ammonia and nitrogen oxides meet at higher rates on the catalyzer surfaces, so that effectiveness thereof is increased.

The present invention utilizes these processes and proposes that the catalyzers have sound continuously impinged upon them during their use. In this connection, it is particularly advantageous to start the continuous sound impingement after periodic sound impingement has been undertaken several times.

If the catalyzers have just recently been inserted, there is frequently no occasion to increase their effectiveness. Only when the catalytic effectiveness has dropped a certain amount does one start with the sound impingement, and in particular initially with a periodic sound impingement. The cleaning or removal achieved thereby allows the catalytic effectiveness to again increase. If the deactivation of the catalyzers has reached a specific extent at which the cleaning effect alone is no longer sufficient, the continuous sound impingement is initiated. The areas of the catalyzer surfaces that have been merely damaged relative to their effectiveness experience such a great increase in effectiveness that the useful life of the catalyzers is significantly increased. Frequently, a premature shut-down of the apparatus can be put off until the next maintenance.

In an important further embodiment of the invention it is additionally proposed that the relative vibrations be generated by vibrating the catalyzers. This manner of operation is less suitable for the intermediate cleaning of the installed catalyzers than for processing spent catalyzers prior to their being ground and subsequently used in the ceramic industry.

The spent catalyzers are processed externally of the nitrogen oxide reduction apparatus, whereby for reasons of environmental protection it is advantageous to suction off the ambient air that is loaded with dust-like contaminants. In so doing, pursuant to a further embodiment of the present invention, the suctioned-off ambient air can be cleaned, with the thereby resulting dust-like contaminants being added to the collected dust deposits as they are conveyed away. There thus results a complete disposal of the contaminants that are vibrated out of the catalyzers, with such contaminants preferably being introduced into a slag tap furnace where they can be smelted to granulate.

It is particularly advantageous to vibrate the catalyzers in modular fashion. Thus, when the catalyzers are pressed out of the modules they are already clean. This has up to now not been the case, so that considerable quantities of dust were released when the modules were disassembled.

The initially mentioned apparatus for cleaning the catalyzers is inventively characterized by closeable chamber,
a screen base disposed within the chamber,
a first conveyor that is disposed within the chamber below the screen base and that leads to a transfer station disposed within the chamber,
an enclosed second conveyor that starts from the transverse station and leads to an exchangeable receiving vessel that is disposed externally of the chamber,
a vibrator disposed within the chamber, whereby the screen base is mounted such that it is able to vibrate, or
an infra sound producer disposed within the chamber.

This apparatus is suitable exclusively for the processing of spent catalyzers and the cleaning thereof as a preliminary step for the grinding and the subsequent delivery of the ceramic material to the ceramic industry.

The infra sound producer can be embodied as a vibration producer or as a siren that generates a pulsating air stream.

The size of the chamber is such that it respectively accommodates one module equipped with catalyzers. This module is placed upon the screen base that is able to vibrate in such a way that the flow channels are oriented vertically. The preferably pneumatically operated vibrator engages or acts upon the module or upon the screen base. Due to the vigorous vibration, which is preferably carried out at high amplitude and low frequency, the dust falls downwardly through the screen base and upon the first conveyor. This conveyor transports the dust to the transfer station, where it is collected and taken up by the second conveyor. The second conveyor is enclosed and leads out of the chamber to the exchangeable receiving vessel. As soon as this vessel is filled, it is taken away and replaced by an empty receiving vessel.

The cleaning effect of the apparatus is very intensive and provides the possibility for being able to supply to the ceramic industry the material of the subsequently ground catalyzers.

Particularly suitable as the first conveyor is a conveyor belt, while a worm conveyor that works in a casing is in particular suitable for the second conveyor. The chamber protects the atmosphere against the dust that is vibrated out of the catalyzers. In contrast, the interior of the chamber is highly charged with toxic dust that contains heavy metals. It is therefore proposed to dispose on the chamber a suction fan that is connected to a separator means. In this way, the dust-laden air is suctioned out of the chamber and is cleaned of the dust particles. It is furthermore advantageous to connect the dust outlet of the separator means, with the chamber closed, with the first conveyor, in which case the dust that originates with the exhaust air can be combined with the dust that falls through the screen base and can be carried off together therewith and disposed of.

In a further important embodiment of the invention, it is proposed that the chamber be provided with a horizontally displaceable hood. To open the chamber, the hood is shifted to the side. After a cleaned module is removed and a contaminated module is placed upon the screen base, the hood is again slid back and the chamber is thus closed. Operation of the apparatus is therefore very simple.

It is particularly advantageous to secure the separator means to the hood. As soon as the hood is shifted into its closed position, the dust outlet of the separator means is automatically in communication with the first conveyor.

It is furthermore very advantageous to provide the apparatus with a travel mechanism to thereby enable a mobile application. This makes it possible to be able to clean the catalyzers at the site of the respective power plant immediately after disassembly from the $NO_x$ removal apparatus. The otherwise necessary dust proof packing of the modules is eliminated.

BRIEF DESCRIPTION OF THE DRAWING

The invention will subsequently be described in detail with the aid of one preferred exemplary embodiment of a cleaning apparatus in conjunction with the accompanying drawing. The drawing shows in.

DESCRIPTION OF PREFERRED EMBODIMENTS

Figure 1:
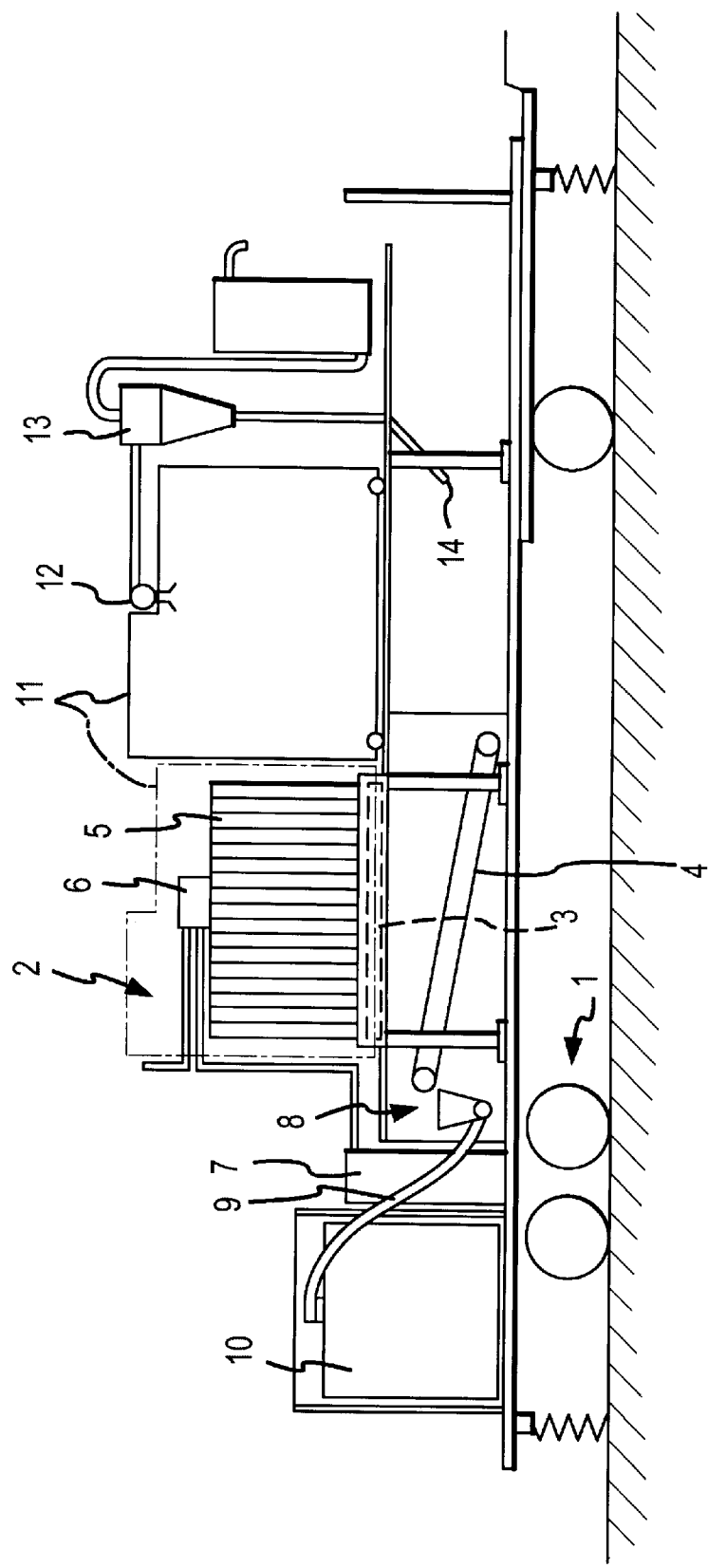
FIG. 1 A schematic side view of a cleaning apparatus.

The apparatus has a travel mechanism 1 and therefore permits a mobile use.

The principal component of the apparatus is a chamber 2, which is provided with a perforated bottom or screen base 3 that is mounted so as to be able to vibrate, as well as below the screen base a first conveyor 4 in the form of a conveyor belt. Disposed upon the screen base 3 is a module 5 that comprises a plurality of spent ceramic catalyzers, the flow channels of which are vertically oriented. The module 5 is engaged or acted upon by a pneumatically operated vibrator 6, which is supplied from a compressor 7.

When the chamber 2 is closed, actuation of the vibrator 6 leads to vigorous vibrational movements of the module 5. In so doing, the toxic dust falls through the screen base 3 onto the first conveyor 4, which conveys the dust to a transfer station 8. An enclosed second conveyor 9, in the illustrated embodiment a worm conveyor, removes the dust from the transverse station 8 and conveys it into a receiving vessel 10. When the latter is filled, it is exchanged for an empty receiving vessel.

The chamber 2 is provided with a hood 11, which is displaceable in a horizontal direction. In FIG. 1, the hood 11 has assumed the position where it is shifted toward the right, in which position the chamber 2 is opened. To close the chamber 2, the hood 11 is shifted toward the left, as indicated by dot-dashed lines.

A suction fan 12 having a separator means 13 is secured to the hood 11. In the illustrated embodiment, the separator means 13 is embodied as a cyclone having a downwardly directed and angled-off dust outlet 14. During operation, the suction fan 12 conveys the air that is laden with toxic dust out of the chamber 2 via the separator means 13, whereby the dust outlet 14 thereof is disposed above the first conveyor 4.

The apparatus permits a simultaneous and careful cleaning of all of the catalyzers that are contained by the module. The catalyzers are subsequently pushed out of the module, whereby there is no danger that the atmosphere will be contaminated with dust. The catalyzers are then ground. The degree of cleanliness of the ceramic material satisfies the requirements of the ceramic industry everywhere where the chemical properties do not play a role, and above all where no active catalytic properties are required. The material can thus be supplied for a significant and economical reuse.

Modifications are by all means possible while staying within the scope of the present invention. For example, instead of being provided with a hood, the chamber can be provided with a hinged cover that permits loading and unloading of a module. Filters that can be removed and/or cleaned could also be used as the separator means. Furthermore, the two conveyors could have a different configuration. To generate the vibrational movement, it has been shown to be advantageous to allow the vibrator to engage the module. However, it is possible to introduce the vibrational movement into the screen base, whereby the module is then fixedly connected to the latter.

Instead of using vibrational movement, it is also possible to operate with infrasonic means. In so doing, the vibrator is replaced by an infra sound producer. In addition, there is eliminated the necessity for mounting the screen base in such a way that it is able to vibrate. The infrasonic means operates at a frequency of about 25 Hz.

An oscillator or also an infrasonic siren can be utilized as the infrasonic means.

Such infrasonic means can furthermore be disposed in nitrogen oxide reduction apparatus in order to carry out intermediate cleaning of the catalyzers.

The present invention is, of course, in no way restricted to the specific disclosure of the specificaiton and drawings, but also encompasses any modifications within the scope of the appended claims.

What is claimed is:

1. A method of processing ceramic components that are contaminated with dust deposits, said method including the steps of:
   generating relative vibrations between said ceramic components and the ambient atmosphere for dislodging dust deposits from said ceramic components, wherein said relative vibrations are generated as gas vibrations in the surrounding atmosphere;
   collecting dislodged dust deposits; and
   conveying said dislodged dust deposits away for disposal or further use.

2. A method according to claim 1, wherein said gas vibrations are generated in the low frequency sound range.

3. A method according to claim 2, wherein said gas vibrations are generated in the infra sound range.

4. A method according to claim 1, wherein said gas vibrations are generated by a vibration producer.

5. A method according to claim 1, wherein said ceramic components are blown against with at least one pulsating gas stream.

6. A method according to claim 2, wherein said ceramic components are continuously impinged with sound during their use.

7. A method according to claim 6, wherein continuous sound impingement is started after periodic sound impingement has been undertaken several times.

8. A method according to claim 1, wherein ambient air that is loaded with dust contaminants is suctioned off.

9. A method according to claim 8, wherein suctioned off ambient air is cleaned and dust contaminants that thereby result are added to said collected dislodged dust deposits as they are conveyed away.

10. A method according to claim 1, wherein said ceramic components are processed in modular fashion.

11. A method according to claim 1, wherein said ceramic components are ground after they are cleaned and the ground ceramic material is conveyed to the ceramic industry as raw material.

12. An apparatus for cleaning ceramic components that are contaminated with dust deposits, comprising:
- a closable chamber;
- a screen base disposed within said chamber;
- a first conveyor that is disposed within said chamber below said screen base and that leads to a transfer station disposed within said chamber;
- a mechanism for generating relative vibrations disposed between said screen base and the atmosphere of said chamber;
- an enclosed second conveyor that starts from said transfer station and leads to a replaceable receiving vessel that is disposed externally of said chamber; and
- an infra sound producer that is disposed within said chamber.

13. An apparatus according to claim 12, wherein said first conveyor is embodied as a conveyor belt.

14. An apparatus according to claim 13, wherein said second conveyor is embodied as a worm conveyor.

15. An apparatus according to claim 12, wherein a suction fan is disposed on said chamber and is connected to a separator means.

16. An apparatus according to claim 15, wherein when said chamber is closed, said separator means communicates via a dust outlet with said first conveyor.

17. An apparatus according to claim 15, wherein said chamber is provided with a horizontally displaceable hood.

18. An apparatus according to claim 17, wherein said separator means is secured to said hood.

19. An apparatus according to claim 12, which includes a travel mechanism that enables a mobile application.

* * * * *